United States Patent [19]

Wada

[11] Patent Number: 4,478,074
[45] Date of Patent: Oct. 23, 1984

[54] AUTOMOTIVE AIR FLOW RATE METERING SYSTEM

[75] Inventor: Shunichi Wada, Hyogo, Japan

[73] Assignee: Mitsubishi Denki Kabushiki Kaisha, Tokyo, Japan

[21] Appl. No.: 406,835

[22] Filed: Aug. 10, 1982

[30] Foreign Application Priority Data

Aug. 11, 1981 [JP] Japan ................................. 56/126970

[51] Int. Cl.³ .............................................. G01F 1/32
[52] U.S. Cl. ................................. 73/118.2; 73/861.22
[58] Field of Search ................ 73/861.22, 118 A, 197, 73/195, 861.24

[56] References Cited

U.S. PATENT DOCUMENTS 3,996,796 12/1976 Adler et al. ........................ 73/861.22
4,254,659 3/1981 Benedetto et al. ................ 73/204 X
4,320,650 3/1982 Kita ................................. 73/861.22 X

*Primary Examiner*—Charles A. Ruehl
*Attorney, Agent, or Firm*—Sughrue, Mion, Zinn, Macpeak & Seas

[57] ABSTRACT

An air flow rate measuring device for use with an internal combustion engine in which a signal accurately representing the air flow rate of intake air in an intake air passage of the engine is always available. A first, frequency signal is generated which has a frequency which varies in proportion to frequency of vortices in a vortex stream in the intake air passage. An analog signal is provided which has an amplitude which varies in accordance with an average of the air flow rate in the intake air passage. By using these signals together, an accurate indication of the air flow rate in the intake air passage is continuously provided.

2 Claims, 2 Drawing Figures

AUTOMOTIVE AIR FLOW RATE METERING SYSTEM

BACKGROUND OF THE INVENTION

The present invention pertains to an air flow rate measuring device (air flow rate meter) for use with an internal combustion engine. More particularly, the invention relates to a vortex-type flow meter having improved transient characteristics.

A von Kármán type flow meter and a swirl type flow meter have recently been used as air flow rate meters. Both types of flow meter provide an output signal having a frequency approximately proportional to the flow rate of intake air. Such an output signal accurately representing an air flow rate is obtainable over a fairly wide air flow rate range. A typical example of such an output signal is a pulse signal which has a high level in response to the detection of a vortex. Since the formation of vortices follows quickly transient variations in the air flow velocity, the output signal also responds to the air flow velocity quickly. However, it is impossible to indicate an actual air flow rate with a time delay shorter than one period (an interval between pulses) of the output signal. Accordingly, the response of the output signal is still not as fast as desired. Further, in the case where each period of the output signal is measured to detect the air flow rate, if the actual flow rate varies greatly during one period of the output signal, the resultant rate indicated by the output signal is much different than the actual flow rate. There is another difficulty in that a stable output cannot be obtained without an averaging process where an average over a number of periods of the output signal is taken because the period of the output signal tends to fluctuate due to distortions in the shapes of the vortices. This defect is fatal to a system in which the fuel flow rate or the exhaust gas of an automobile is controlled on the basis of the flow rate of intake air. Further, since the conventional vortex flow meter operates to detect the frequency of formation of vortices, it is disadvantageous in that, upon occurrence of turbulence, the formation of vortices is distorted resulting in an error in the output signal.

It is the primary object of the present invention to eliminate the above-described drawbacks accompanying prior art flow meters.

SUMMARY OF THE INVENTION

Overcoming the drawbacks of the prior art vortex-type flow meters, the invention provides an air flow rate measuring device in which both a frequency signal and an analog signal are produced to represent the intake air flow rate of an internal combustion engine. The frequency signal is a pulse output signal in which the frequency of the pulses is directly proportional to the instantaneous flow or flow rate of vortices in an intake air passage which is directly related to the instantaneous flow rate of the air flow. The analog signal has an amplitude which varies in correspondence with the average air flow velocity. By the use of these two signals, an accurate indication of the air flow rate in the intake passage is always available.

DESCRIPTION OF THE PREFERRED EMBODIMENTS

Figure 1:
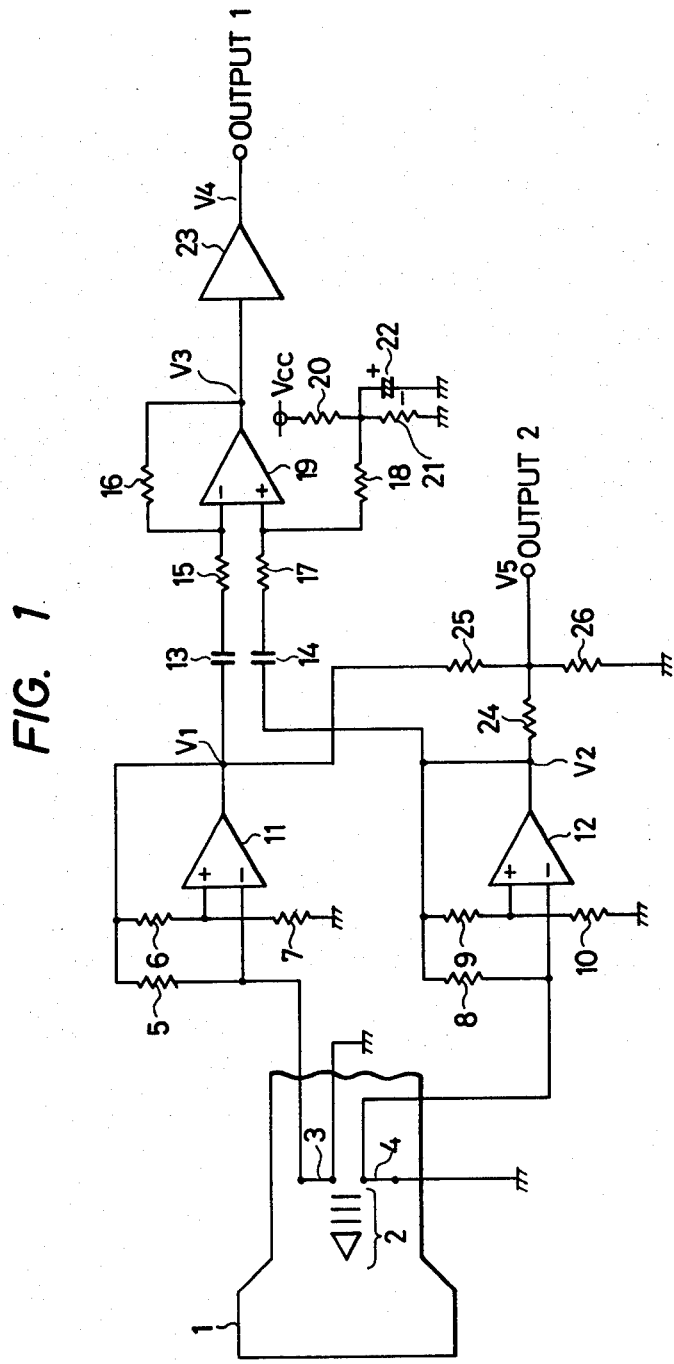
FIG. 1 is a circuit diagram of a preferred embodiment of a vortex-type air flow rate measuring device of the present invention.

FIG. 1 is a circuit diagram showing the construction of an air flow rate measuring device of the present invention.

In FIG. 1, reference numerals 1 and 2 indicate an air intake passage and a vortex generator, respectively. Reference numerals 3 and 4 indicate a pair of heater wires which are disposed downstream of the vortex generator 2. The temperature of the wire 3 is maintained constant by a circuit which includes resistors 5, 6 and 7 and an operational amplifier 11, while the temperature of the wire 4 is maintained constant by a circuit which includes resistors 8, 9 and 10 and an operational amplifier 12. The control voltages applied across the heater wires 3 and 4 are designated by $V_1$ and $V_2$, respectively. A signal $V_3$ representing the difference between these control voltages $V_1$ and $V_2$ is produced by a different amplifier circuit composed of capacitors 13, 14 and 22, resistors 15, 16, 17, 18, 20 and 21, and a operational amplifier 19. The signal $V_3$ is shaped by a waveform shaping circuit 23 to produce a pulsed frequency output signal $V_4$, i.e., an output 1, the pulse frequency of which varies in proportion to the flow of vortices in the intake air passage which is directly related to the instantaneous flow rate of the air flow. The frequency of $V_3$ is proportional to the instantaneous flow of vortices in the intake air passage. The vortex flow is a product of the vortex velocity and the vortex density. The vortex velocity equals the air velocity since the vortices flow with the air. The generation rate of vortices is directly proportional to the air velocity but the vortex density is the ratio of the vortex generation rate and the vortex velocity. Therefore, the frequency of $V_3$ or the measured vortex flow is directly proportional to the instantaneous velocity or flow rate of the air flow and of the vortex flow. It should be noted that the frequency of $V_3$ is also proportional to the vortex generation rate. On the other hand, the signals $V_1$ and $V_2$ are summed by a network composed of resistors 24, 25 and 26 to produce an analog output signal $V_5$, i.e., an output 2, the voltage level of which varies in accordance with the average flow rate of ambient air in the passage.

Figure 2:
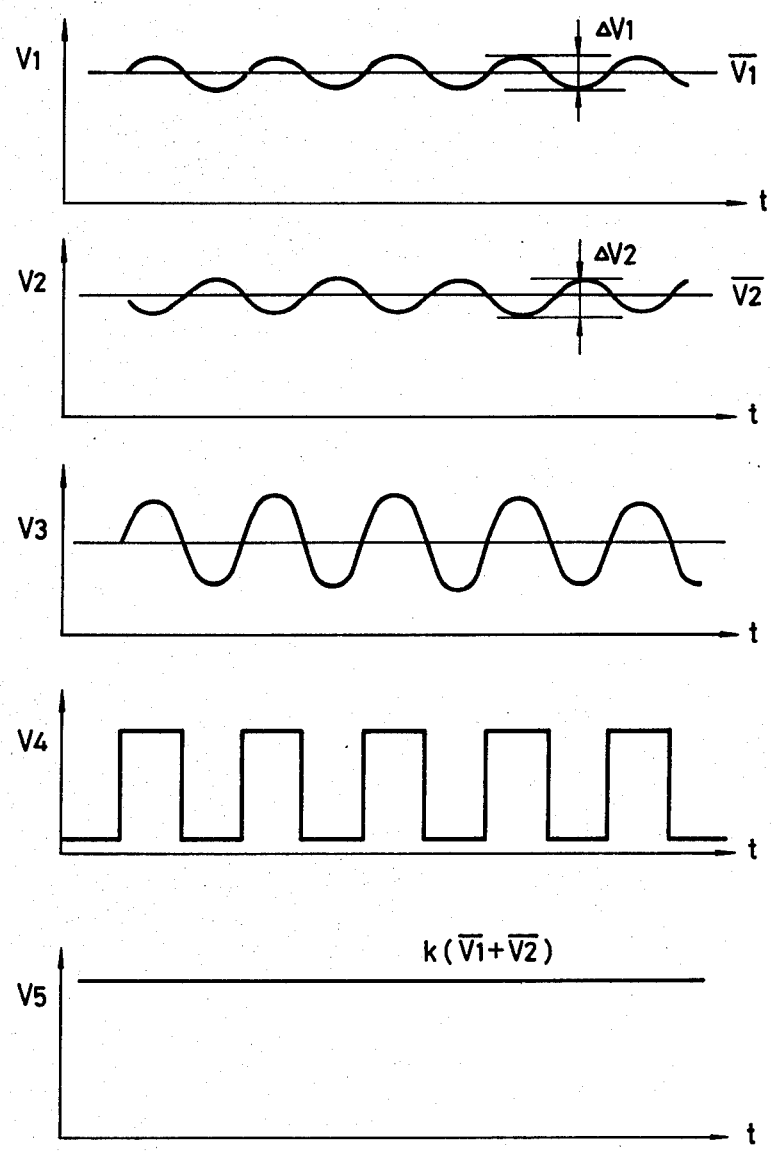
FIG. 2 is a waveform diagram showing signal waveforms at various points in the circuit of FIG. 1.

The waveforms of the various signals indicated in FIG. 1 are shown in FIG. 2. In the air flow measuring device of FIG. 1, there are generated downstream of the vortex generator 2 a stream of von Kármán vortices in a pattern which is regular and symmetric with respect to a line extending directly downstream from the vortex generator 2. The wires 3 and 4 are cooled down partly by the ambient flow and partly by the stream of von Kármán vortices. Cooling of the wires 3 and 4 by the passing vortices occurs due to the passage of vortices and also due to the mean flow of ambient air in the passage. Control voltages $V_1$ and $V_2$ are generated which attempt to maintain the respecting heating wires at a constant temperature. The control voltages $V_1$ and $V_2$ thus have DC components $\overline{V}_1$ and $\overline{V}_2$ corresponding to the mean flow velocity and AC (frequency) components $\Delta V_1$ and $\Delta V_2$ corresponding to the time varying cooling produced by the von Kármán vortices. The components $\Delta V_1$ and $\Delta V_2$ have opposite polarities. By differencing those two signals, a signal $V_3$ of increased amplitude but with the same frequency as either of $\Delta V_1$ and $\Delta V_2$ is produced. Thus, the pulsed output signal $V_4$, produced by wave shaping the signal $V_3 = K_1 (\Delta V_1 - \Delta V_2)$, where $K_1$ is a gain factor, has a frequency which varies in proportion to the generation and to the flow rate of vortices.

The components $\overline{V}_1$ and $\overline{V}_2$ are functions of the mean flow velocity U, as described by $\overline{V}_1 = \overline{V}_2 = (a + bU^{\frac{1}{2}})^{\frac{1}{2}}$, where a and b are constants. The time varying components $\Delta V_1$ and $\Delta V_2$ in the signals $V_1$ and $V_2$ are cancelled upon summing the signals $V_1$ and $V_2$ because the components $V_1$ and $V_2$ are equal in amplitude but opposite in sign. The resultant signal $V_5$ can thus be expressed as $V_5 = V_1 + V_2 = k\overline{V}_1 = k\overline{V}_2$. The resultant signal $V_5$ is highly responsive to changes in the average air flow rate.

By effectively using both of the signals $V_4$ and $V_5$, it is possible to realize an automotive air flow rate measuring device which is highly precise and responsive.

By averaging either the period or the frequency of the output $V_4$ for a relatively long period of time, the air flow rate can be very accurately indicated. On the other hand, during transients in the air flow rate, if the above-described averaging process, requiring a long period of time, were utilized, the response speed would not be adequate. Therefore, during the times when transients are occurring, the averaging period is shortened so that the air flow rate can be detected with a higher response speed. The presence of transients is detected using the output signal $V_5$, which responds very quickly to change in the air flow rate.

Although the foregoing embodiment has been described with reference to a case where von Kármán vortices are detected by means of paired heater wires, similar effects will be produced in the case of a swirl type vortex flow meter or in the case of using one or more than two heater wires. Although the description thus far is directed to cases where the vortex detecting structure employs heater wires, similar effects can be achieved if thermistors or other heat-sensitive elements are employed.

Moreover, the invention is advantageous in that, even if one of the paired heater wires is broken so that the frequency signal fails, the analog signal representing the mean flow velocity can be used as a backup signal. Still further, if the formation of vortices is disturbed due to transients in the intake air flow or an undesired air flow in a backward direction caused by misfiring or the like, according to the present invention, a precise indication of the air flow rate is nevertheless still provided by the analog signal $V_5$.

As described above, according to the present invention, an air flow rate meter having a simple construction is provided which produces a frequency output signal having a frequency proportional to the vortex frequency and thus instantaneous flow rate and an analog signal having an amplitude corresponding to an average air flow rate to thereby eliminate the drawbacks accompanying prior art air flow meters in which only a frequency output signal is employed to indicate the air flow rate.

What is claimed is:

1. An air flow measuring device for an internal combustion engine, comprising:
    means (2) for generating vortices positioned within an intake air passage (1) of said combustion engine;
    two heater wires (3, 4) positioned downstream of said vortex generating means;
    two amplifying and biasing circuits (11, 12) connected separately to said heater wires for maintaining said heater wires at a constant temperature whereby a control voltage ($V_1$, $V_2$) is output from each of said two amplifying and biasing circuits;
    differencing means (19) for obtaining a difference signal ($V_3$) of said two control voltages whereby the frequency of said difference signal measures the generation rate of said vortices and thereby the instantaneous air flow; and
    summing means (24, 25, 26) for obtaining a sum signal ($V_5$) of said control voltages whereby said sum signal measures the average air flow.

2. An air flow measuring device as recited in claim 1, further comprising a pulse forming circuit (23) connected to said difference signal.

* * * * *